United States Patent [19]

Goto et al.

[11] Patent Number: 4,886,767

[45] Date of Patent: Dec. 12, 1989

[54] SILICON NITRIDE-CERAMIC AND A MANUFACTURING METHOD THEROF

[75] Inventors: Yasuhiro Goto, Urayasu; Takeyuki Yonezawa, Machida; Yoshiyuki Ohnuma, Kawasaki, all of Japan

[73] Assignee: Kabushiki Kaisha Toshiba, Kawasaki, Japan

[21] Appl. No.: 152,716

[22] Filed: Feb. 5, 1988

Related U.S. Application Data

[63] Continuation-in-part of Ser. No. 117,544, Nov. 6, 1987, abandoned.

[30] Foreign Application Priority Data

Nov. 21, 1986 [JP] Japan .................................. 61-276638

[51] Int. Cl.$^4$ ............................................... C04B 35/58
[52] U.S. Cl. ....................................... 501/97; 501/98; 264/60
[58] Field of Search ...................... 501/97, 98; 204/60

[56] References Cited

U.S. PATENT DOCUMENTS

| | | | |
|---|---|---|---|
| 3,432,295 | 3/1969 | Frank et al. | 264/60 |
| 3,442,997 | 5/1969 | Parratt | 264/60 |
| 4,563,433 | 1/1986 | Yeckley et al. | 501/97 |
| 4,696,710 | 9/1987 | Minjolle et al. | 264/60 |

FOREIGN PATENT DOCUMENTS

| | | |
|---|---|---|
| 116671 | 9/1980 | Japan . |
| 0088171 | 5/1983 | Japan . |
| 56-1091065 | 5/1986 | Japan . |
| 00380615 | 5/1973 | U.S.S.R. . |

OTHER PUBLICATIONS

Weston, "Origin of strength anisotropy in hot-pressed silicon nitride," *Journal of Material Science* 15, 1980, pp. 1568-1776.

Lange, "Relation Between Strength, Fracture Energy, and Microstructure of Hot-Pressed Si$_3$N$_4$," *Journal of the American Ceramic Society*, vol. 56, No. 10, Oct. 1973, pp. 518-522.

Nuttall, et al., "Observations on the microstructure of Hot-pressure silicon nitride," *Journal of Materials Science*, 9, 1974, pp. 850-853.

*Primary Examiner*—Mark L. Bell
*Assistant Examiner*—David M. Brunsman
*Attorney, Agent, or Firm*—Foley & Lardner, Schwartz, Jeffery, Schwaab, Mack, Blumenthal & Evans

[57] ABSTRACT

A silicon nitride-ceramic is composed of a sintered body including silicon nitride and an additive, and has a columnar crystal of $\beta$ type silicon nitride substantially parallel to one plane. A method for manufacturing a silicon nitride-ceramic comprises the steps of forming first powder including a needle-shaped crystal of $\beta$ type silicon nitride by mixing the needle-shaped crystal of the $\beta$ type silicon nitride with second silicon nitride powder mainly of $\alpha$ type including an additive, or by heating the second silicon nitride powder at temperature 1500° to 1750° C. in advance; and sintering the first powder at a predetermined temperature under non-oxidation atmosphere.

7 Claims, 2 Drawing Sheets

SILICON NITRIDE-CERAMIC AND A MANUFACTURING METHOD THEROF

This application is a continuation-in-part application of Ser. No. 117,544, filed Nov. 6, 1987 now abandoned.

The present invention relates to a ceramic sintering material including as a main component silicon nitride having excellent mechanical properties in room and high temperatures and a manufacturing method of the ceramic sintering material.

BACKGROUND OF THE INVENTION

In silicon nitride-ceramics, phase transformation of $\alpha$ to $\beta$ in a sintering process occurs by using powder including $\alpha$ type silicon nitride powder as a main component so that $\beta$ type silicon nitride is formed and becomes columnar crystals entangled with each other. As is well known, such an entangled structure has improved mechanical properties in comparison with a structure formed by particles having an isotropic shape. In the normal pressure sintering, the $\beta$ type columnar crystals entangled in three dimensions is formed. In the hot press process, the $\beta$ type columnar crystal is mainly oriented on a plane perpendicular to the hot pressing direction so that the mechanical properties with respect to this plane are slightly improved. However, the mechanical strength of such sintered materials is especially deteriorated at high temperature, and a sufficient fracture toughness cannot be obtained in the materials.

The silicon nitride-ceramics have problems in, especially, the deterioration in strength at high temperature and low fracture toughness.

SUMMARY OF THE INVENTION

To solve the problems mentioned above, an object of the present invention is to provide a silicon nitride-ceramic having excellent mechanical properties.

With the above object in view, the present invention resides in a silicon nitride-ceramic composed of a sintered body of silicon nitride-additive system characterized in a main portion of a columnar crystals of $\beta$ type silicon nitride is oriented in parallel to a plane.

The present invention also resides in a silicon nitride-ceramic comprising the steps of forming first powder including a needle-shaped crystal of $\beta$ type silicon nitride, generally having an aspect ratio of one to more than two, by mixing the needle-shaped crystal of the $\beta$ type silicon nitride with second silicon nitride powder mainly of type including an additive, or by heating the second silicon nitride powder at temperature 1500° to 1750° C. in advance; and sintering the first powder at a predetermined temperature in a non-oxidizing atmosphere.

BRIEF DESCRIPTION OF THE DRAWINGS

The present invention will be more apparent from the following preferred embodiments thereof in conjunction with the accompanying drawings in which.

DETAILED DESCRIPTION OF THE PREFERRED EMBODIMENTS

The preferred embodiments of a silicon nitride ceramic and the manufacturing method thereof in the present invention will now be described with reference to the drawings.

When a needle-shaped crystal of $\beta$ type silicon nitride is parallel to a plane, its mechanical strength on the plane is improved. Whether the needle-shaped crystal of $\beta$ type silicon nitride is parallel to the plane is found by diffracting it by X ray with respect to this plane and calculating the ratio $I_{101}/I_{210}$ which is a diffractive intensity $I_{101}$ of $\beta$ type silicon nitride with respect to plane (101) to a diffractive intensity $I_{210}$ thereof with respect to plane (210). Namely, when the ratio $I_{101}/I_{210}$ is smaller, more columnar crystals are parallel to this plane. In the case of the conventional normal pressure sintering, the ratio $I_{101}/I_{210}$ is approximately 1.0 and therefore the crystals are almost completely oriented in three dimensions. In the case of the hot press, the ratio $I_{101}/I_{210}$ is smaller than 1 so that there are slightly more columnar crystals of the $\beta$ type silicon nitride parallel to the plane perpendicular to the hot pressing direction. Even in this case, the ratio $I_{101}/I_{210}$ is greater than 0.5 and the mechanical properties with respect to this plane are not greatly improved.

To overcome the problems mentioned above, in the present invention, powder including a needle-shaped crystal of $\beta$ type silicon nitride is used to increase the ratio of the columnar crystals of the $\beta$ type silicon nitride parallel to a plane in a sintered body, so that a ratio of $I_{101}/I_{210}$ smaller than 0.4 is obtained, thereby improving the mechanical properties with respect to this plane, i.e., the strength against high temperature and fracture toughness.

Figure 1:
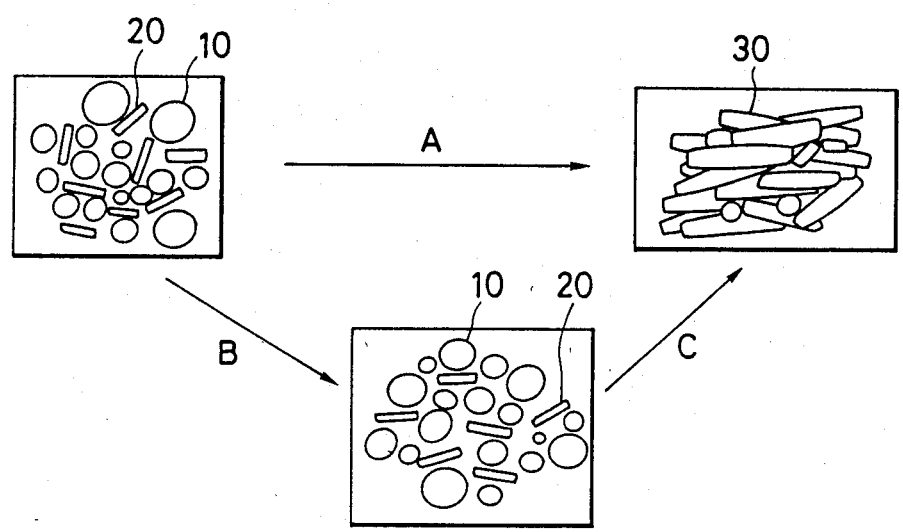
FIG. 1 is a view for explaining the manufacturing processes of a silicon nitride-ceramic in accordance with the present invention.

As shown in FIG. 1, when powder including a needle-shaped crystal 20 of $\beta$ type silicon nitride $\beta$-$Si_3N_4$ is hot-pressed, the powder is pressurized and the needle-shaped crystal 20 is oriented on a plane perpendicular to the hot pressing direction, and $\alpha$ type silicon nitride 10 is transformed therefrom to $\beta$ type silicon nitride with the needle-shaped crystal as nuclei, so that the columnar crystal of the $\beta$ type silicon nitride grows. Accordingly, a major portion of a particle 30 of the $\beta$ type silicon nitride-columnar crystal is oriented in parallel to this plane in the sintered body. In FIG. 1, reference numeral A designates the hot pressing process.

When the powder including the needle-shaped crystal 20 of the $\beta$ type silicon nitride is molded by injection molding, extrusion molding, slip casting, etc., the needle-shaped crystal is oriented in parallel to the injected direction, the extruded direction, the molded surface, etc., in the molded body. When such needle-shaped crystal is then sintered by normal pressure, $\alpha$ to $\beta$ transformation occurs with the needle-shaped crystal as nuclei, thereby obtaining a sintered body in which the columnar crystals 30 of the $\beta$ type silicon nitride oriented in the injected direction, the extruded direction, the molded surface, etc. In FIG. 1, reference numeral B designates the molding process by the injection molding, the extrusion molding, slip casting, etc., and reference numeral C designates the normal pressure sintering process.

Such processes provide a silicon nitride ceramic having excellent mechanical properties in a certain direction.

EMBODIMENTS

Compositions shown in the Table described later are respectively selected using silicon nitride powder mainly of α type having average particle diameter 1.2μ, yttrium oxide ($Y_2O_3$) having average particle diameter 1.0μ, alumina ($Al_2O_3$) having average particle diameter 0.5μ, aluminum nitride (AlN) having average particle diameter 1.0μ, zirconium oxide ($Zr_2O_3$) having average particle diameter 0.8μ, and magnesia having average particle diameter 0.5μ. The compositions are respectively mixed in a rubber lining ball mill for about 24 hours using n-butanol as a solvent. Ten kinds of powders mainly including silicon nitride containing those in reference examples 1 to 3 are respectively adjusted.

Such powders are respectively heated at temperature 1620° to 1780° C. under nitrogen atmosphere to obtain powders including needle-shaped crystals of β type silicon nitride. In the reference examples 1 to 3, such heating process is not performed.

The powders are hot-pressed for 90 minutes under a condition of temperature 1780° C. and pressure 300 kg/cm². Stearic acid constituting a binder is added to the powder at weight ratio 40%, and the added material is molded by injection molding, thereby obtaining a bar-shaped molded body having 60 mm in length, 40 mm in width, and 10 mm in thickness. Such molded body is first heated at temperature 700° C. and the binder is volatilized and removed from the molded body. Thereafter, the molded body is sintered by normal pressure for 120 minutes at temperature of 1800° C. under nitrogen atmosphere, thereby obtaining a sintered body of silicon nitride-ceramic.

The diffractive intensities by X ray with respect to the plane perpendicular to the hot pressed direction and the plane parallel to the injected direction are measured with respect to the sintered body obtained above to calculate the ratio $I_{101}/I_{210}$. The bending strengths and fracture toughnesses with resepct to these planes are also respectively measured and shown in Table as follows.

TABLE

| Sample | Material composition | | | | | | Ratio of β type crystal in powder | $I_{101}/I_{210}$ | Sintering method | Temperature (°C.) for heat treatment | Bending strength (kg/mm²) | | Fracture toughness (MPam1/2) |
|---|---|---|---|---|---|---|---|---|---|---|---|---|---|
| | $Si_3N_4$ | $Y_2O_3$ | $Al_2O_3$ | AlN | $ZrO_2$ | MgO | | | | | normal temperature | 1200° C. | |
| Embodiment 1 | 92 | 2 | 2 | 0 | 2 | 2 | 35 | 0.15 | HP | 1750 | 115 | 92 | 11.4 |
| Embodiment 2 | 87 | 6 | 2 | 5 | 0 | 0 | 17 | 0.21 | NS | 1680 | 96 | 84 | 9.6 |
| Embodiment 3 | 94 | 4 | 1 | 0 | 1 | 0 | 28 | 0.18 | HP | 1720 | 109 | 96 | 10.1 |
| Embodiment 4 | 80 | 10 | 0 | 6 | 4 | 0 | 13 | 0.20 | NS | 1650 | 92 | 75 | 9.1 |
| Embodiment 5 | 78 | 0 | 3 | 0 | 0 | 6 | 31 | 0.12 | HP | 1760 | 101 | 76 | 9.6 |
| Embodiment 6 | 79 | 10 | 2 | 2 | 2 | 0 | 41 | 0.08 | HP | 1780 | 121 | 104 | 11.3 |
| Embodiment 7 | 87 | 5 | 2 | 3 | 1 | 1 | 9 | 0.25 | NS | 1620 | 92 | 80 | 8.8 |
| Reference 1 | 91 | 5 | 4 | 0 | 0 | 0 | 2 | 0.45 | HP | — | 90 | 69 | 6.3 |
| Reference 2 | 87 | 6 | 2 | 5 | 0 | 0 | 3 | 1.00 | NS | — | 85 | 51 | 5.4 |
| Reference 3 | 84 | 10 | 2 | 0 | 2 | 2 | 2 | 1.00 | NS | — | 70 | 36 | 5.6 |

HP: Hot press
NS: Normal pressure sintering

The bending strength is measured by bending a sample at three points thereof having 3×4×40 mm in size under the conditions of 0.5 mm/minute in cross head speed, 30 mm in span, at the normal temperature and 1200° C. in temperature. The bending strength is measured 8 times at the respective temperatures, and the average value thereof is used in Table. The fracture toughness value $K_{IC}$ is calculated by the following formula in accordance with experiments at the room temperature under the conditions of 30 mm in span and 0.5 mm/min in cross head speed where a U-shaped notch having 0.3 mm in width and 0.75 mm in depth is formed in a central portion of the sample by a diamond cutter based on $JISR_{1601}$.

$$K_{IC} = Y\sigma a/2$$

where Y is geometry correction factor, $\sigma$ is bending strength, and a is length of cracking.

As shown in Table, when the ratio $I_{101}/I_{210}$ of the sample is smaller than 0.4, the sintered body as the sample has a high bending strength at the room temperature and high temperature and an excellent fracture toughness. In the embodiments 1 to 7 of Table, the weight % of β type silicon nitride in powder after the heat treatment is given.

Figure 2:
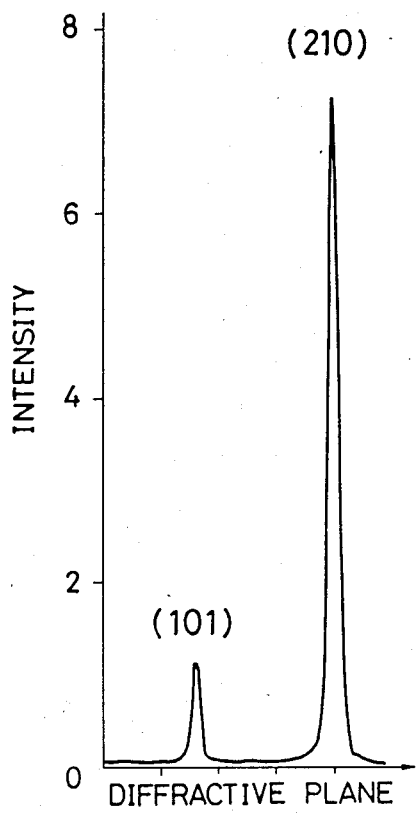
FIG. 2 is a graph for showing a ratio $I_{101}/I_{210}$ in the silicon nitride-ceramic provided in one embodiment of the present invention.

FIG. 2 is a view showing the ratio $I_{101}/I_{210}$ when a material including yttrium oxide ($Y_2O_3$) of 5 weight %, and alumina ($Al_2O_3$) of 3 weight % is hot-pressed for 90 minutes at temperature 1780° C. and pressure 300 kg/cm². As shown in FIG. 2, the ratio $I_{101}/I_{210}$ of the material is 0.15 and very small in comparison with the conventional material.

In the present invention, the additive of the silicon nitride is at least one selected from rare earth oxides such as yttria, alumina, magnesia, aluminum nitride, iron oxide, titanium oxide, zirconium oxide and molybdenum carbide, preferably in the amount of 0.1 to 15 weight %.

Further, it is preferable to form powder including a needle-shaped crystal of the β type silicon nitride by mixing the needle-shaped crystal of the β type silicon nitride with silicon nitride powder mainly of α type including the additive, or by heating such powder at temperature 1500° to 1750° C. in advance. The amount of the needle-shaped crystal of the β type silicon nitride included in the powder is preferably 5 to 50 weight %. The powder including the needle-shaped crystal of the β type silicon nitride is preferably sintered at temperature 1650° to 1850° C. under non-oxidation atmosphere.

As mentioned above, a silicon nitride-ceramic in the present invention has excellent fracture toughness and strength against high temperature.

What is claimed is:

1. A silicon nitride-ceramic composed of a sintered body including silicon nitride and 0.1 to 15 weight % of at least one additive, said ceramic having columnar crystals of β type silicon nitride oriented substantially in parallel to one plane, the ratio ($I_{101}/I_{210}$) of intensity ($I_{101}$) of plane (101) of the β type silicon nitride to intensity ($I_{210}$) of plane (210), determined by x-ray diffraction, being less than 0.4 with respect to the plane in which the columnar crystals are oriented, to improve mechanical properties of the ceramic with respect to said plane.

2. A silicon nitride-ceramic as claimed in claim 1, wherein said additive is at least one material selected from the group consisting of rare earth oxides, alumina, magnesia, aluminum nitride, iron oxide, titanium oxide, zirconium oxide and molybdenum carbide.

3. A method for manufacturing a silicon nitride-ceramic, comprising the steps of:
    forming a raw material of mainly α type silicon nitride including 0.1 to 15 weight % of at least one additive and 5–50 weight % of needle-shaped crystals of β type silicon nitride; and
    sintering the raw material at a temperature of approximately 1650° to 1850° C. to orient the β type silicon nitride approximately in parallel to one plane so that the ratio ($I_{101}/I_{210}$) of intensity ($I_{101}$) of plane (101) of the β type silicon nitride to intensity ($I_{210}$) of plane (210) thereof, determined by x-ray diffraction, is less than 0.4 with respect to the plane in which the needle-shaped crystals of the β type silicon nitride are oriented, thereby improving mechanical properties of the ceramic with respect to said plane.

4. A manufacturing method as claimed in claim 3, wherein the orienting and sintering steps are simultaneously performed by hot pressing.

5. A manufacturing method as claimed in claim 3, wherein the orienting step is performed by one of injection molding, extrusion molding and slip casting.

6. A manufacturing method as claimed in claim 3, wherein said additive selected from the group consisting of rare earth oxides, alumina, magnesia, aluminum nitride, iron oxide, titanium oxide, zirconium oxide and molybdenum carbide.

7. A manufacturing method according to claim 3, wherein said raw material is obtained by heating the α type silicon nitride powder including said additive at a temperature from 1500° to 1750° C.

* * * * *